US 11,840,407 B2

(12) United States Patent
Snow et al.

(10) Patent No.: US 11,840,407 B2
(45) Date of Patent: Dec. 12, 2023

(54) REMOVABLE CARTRIDGE CONVEYOR BELT CLEANER

(71) Applicant: Flexible Steel Lacing Company, Downers Grove, IL (US)

(72) Inventors: Joseph Snow, Alto, MI (US); Brian Wood, Newaygo, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 190 days.

(21) Appl. No.: 17/344,226

(22) Filed: Jun. 10, 2021

(65) Prior Publication Data

US 2022/0396432 A1   Dec. 15, 2022

(51) Int. Cl.
*B65G 45/16* (2006.01)
*F16M 13/02* (2006.01)

(52) U.S. Cl.
CPC ............. *B65G 45/16* (2013.01); *F16M 13/02* (2013.01)

(58) Field of Classification Search
None
See application file for complete search history.

(56) References Cited

U.S. PATENT DOCUMENTS

| 3,631,968 | A | 1/1972 | Ward |
| 3,656,610 | A | 4/1972 | McWilliams |
| 3,841,469 | A | 10/1974 | Scott |
| 3,875,613 | A | 4/1975 | Pincus |
| 4,053,045 | A | 10/1977 | Reiter |
| 4,182,444 | A | 1/1980 | Fisher |
| 4,249,650 | A | 2/1981 | Stahura |
| 4,529,084 | A | 7/1985 | Zhang |

(Continued)

FOREIGN PATENT DOCUMENTS

| DE | 2942268 | 2/1981 |
| JP | S4734980 U | 10/1972 |

(Continued)

OTHER PUBLICATIONS

Martin Orion Belt Cleaning Systems—Orion-2000 Secondary Cleaner. Form No. L3709-06/08 (2005, 2008).

(Continued)

*Primary Examiner* — Joseph A Dillon, Jr.
(74) *Attorney, Agent, or Firm* — Fitch, Even, Tabin & Flannery LLP

(57) ABSTRACT

A removable cartridge cleaner assembly is provided that allows for easier replacement of the belt cleaner blades from under a conveyor belt. In one aspect the assembly includes a cartridge assembly configured for connection with at least one belt cleaner blade assembly and a support assembly configured to support the cartridge assembly across a transverse width of the conveyor belt. A releasable connection between the cartridge assembly and the support assembly is configured to be sheltered from dust and debris. The releasable connection may be disposed within a chamber formed by the engaging portions of the cartridge and support assemblies. The releasable connection can be released by removing a longitudinally oriented rod member that extends along a length of the cartridge and support assemblies. The support assembly may include a secondary cartridge support for easing installation and removal of the cartridge assembly.

33 Claims, 12 Drawing Sheets

(56) References Cited

U.S. PATENT DOCUMENTS

| | | |
|---|---|---|
| 4,533,035 A | 8/1985 | Reiter |
| 4,533,037 A | 8/1985 | Kerr |
| 4,586,600 A | 5/1986 | Lindbeck |
| 4,620,627 A | 11/1986 | Griffiths |
| 4,696,389 A | 9/1987 | Schwarze |
| 4,825,996 A | 5/1989 | Davidts |
| 4,836,356 A | 6/1989 | Mukai |
| 4,915,211 A | 4/1990 | Dohmeier |
| 4,953,689 A | 9/1990 | Peterson et al. |
| 5,247,778 A | 9/1993 | Tisma |
| 5,727,670 A | 3/1998 | Johnson |
| 6,056,112 A | 5/2000 | Wiggins |
| 6,315,105 B1 | 11/2001 | Gibbs et al. |
| 6,321,901 B1 | 11/2001 | Strebel et al. |
| 6,581,754 B2 | 6/2003 | Law |
| 6,823,983 B2 | 11/2004 | Devries |
| 6,860,378 B1 | 3/2005 | Johannsen |
| 6,874,616 B2 | 4/2005 | Devries et al. |
| 6,929,112 B2 | 8/2005 | Hall |
| 6,991,088 B1 | 1/2006 | Smith |
| 7,007,794 B2 | 3/2006 | Waters et al. |
| 7,093,706 B2 | 8/2006 | Devries et al. |
| 7,216,756 B2 | 5/2007 | Swinderman |
| 7,308,980 B2 | 12/2007 | Peterson et al. |
| 7,367,443 B2 | 5/2008 | Swinderman |
| 7,370,750 B2 | 5/2008 | Swinderman |
| 7,740,127 B2 | 6/2010 | Swinderman et al. |
| 7,987,966 B2 | 8/2011 | Devries et al. |
| 8,205,741 B2 * | 6/2012 | Swinderman .......... B65G 45/16 198/571 |
| 8,245,836 B2 * | 8/2012 | Kotze .................... B65G 45/12 198/499 |
| 8,312,986 B2 | 11/2012 | Devries et al. |
| 8,393,459 B2 | 3/2013 | Childs |
| 8,485,344 B1 | 7/2013 | Liland |
| 8,640,856 B2 | 2/2014 | Devries et al. |
| 8,757,360 B2 | 6/2014 | Kuiper et al. |
| 9,085,419 B2 | 7/2015 | Kuiper et al. |
| 9,090,405 B2 | 7/2015 | Devries et al. |
| 9,169,081 B1 | 10/2015 | Harrison et al. |
| 9,376,264 B1 | 6/2016 | Foley |
| 10,836,585 B2 | 11/2020 | Devries |
| 2002/0079196 A1 | 6/2002 | Law |
| 2005/0121294 A1 | 6/2005 | Finger |
| 2006/0131136 A1 | 6/2006 | Smith et al. |
| 2008/0023298 A1 | 1/2008 | Davidts |
| 2008/0251358 A1 | 10/2008 | Thew |
| 2009/0173599 A1 | 7/2009 | Khanania |
| 2010/0000842 A1 | 1/2010 | Devries et al. |
| 2011/0192705 A1 | 8/2011 | Kotze |
| 2012/0305367 A1 | 12/2012 | Wilfried |
| 2013/0026008 A1 | 1/2013 | Childs |
| 2014/0238822 A1 * | 8/2014 | Smith .................... B65G 45/12 198/497 |
| 2019/0248598 A1 | 8/2019 | Fransson |

FOREIGN PATENT DOCUMENTS

| | | |
|---|---|---|
| JP | S5978318 U | 5/1984 |
| JP | H0581125 U | 11/1993 |

OTHER PUBLICATIONS

Martin Orion Belt Cleaning System—Belt Cleaners, Form No. L3719-07/08 (2005, 2008).

Martin Orion Belt Cleaning System—Orion-2000 and H20-4000 Belt Cleaners Operator's Manual M3702 (2005, 2009).

Notification of Transmittal of the International Search Report and the Written Opinion of the International Searching Authority, or the Declaration from the International Bureau of WIPO for related International Application No. PCT/US22/33018, dated Sep. 16, 2022, 9 pages.

Invitation to Pay Additional Fees and, Where Applicable, Protest Fee issued in International Patent Application No. PCT/US22/30108 dated Aug. 1, 2022.

Machine English translation of webpage showing Martin Engineering in Line XHD Primary Scraper, believed to be publically available at least as early as Dec. 18, 2018: https://www.martin-eng.com.br/content/product/4011/raspador-primario-inline-xhd.

Notification of Transmittal of the International Search Report and the Written Opinion of the International Searching Authority, or the Declaration from the International Bureau of WIPO for related International Application No. PCT/US22/30108, dated Sep. 23, 2022, 10 pages.

* cited by examiner

REMOVABLE CARTRIDGE CONVEYOR BELT CLEANER

FIELD OF THE INVENTION

The invention relates to a cleaner assembly for a conveyor belt and, more particularly, to a cleaner assembly with a removable cartridge assembly that can be easily installed under a conveyor belt and removed therefrom.

BACKGROUND OF THE INVENTION

A variety of industries utilize conveyor belts to transport goods and materials from one place to another. Generally, material is deposited onto the upstream end of the upper or carry run of a belt and is discharged at the downstream end of the carry run of the belt. However, small amounts of material often remain adhered to the belt surface. That material can remain adhered as the belt travels along the lower or return run and back to the carry run. As is known, it is desirable to scrape the belt clean so that it is free of material adhered thereto.

Secondary belt cleaners are mounted downstream of the head pulley under the conveyor belt. Generally the belt cleaners are operatively mounted to an elongate mounting pole that extends below and across the belt. The scraping or cleaning blades of the belt cleaners are biased into engagement with the conveyor belt and remove the material adhered thereto.

Resilient mounts located at either end of the elongate pole or support member provide limited vertical and/or rotational movement to minimize damage to the belt and splices formed therealong and maximize material removal. Examples of resilient mounts include spring tensioners and pneumatic tensioners. In addition, resiliently mounted cleaning blades further minimize belt damage and maximize material removal. The resilient mounts typically bias the cleaning blades into engagement with the belt. The cleaning blades move with the conveyor belt as the cleaning blades encounter surface irregularities, such as metallic belt fasteners used to splice the conveyor belt.

Over time the cleaning blades of belt cleaners require maintenance and/or replacement. Some prior belt cleaners include elongate members removably mounted to the resilient mounts, allowing an operator to remove the elongate member and cleaning blades out from under the conveyor belt to perform maintenance. However, this configuration can require that the operator have access to both ends of the belt scraper assembly to dismount the elongate member. Further, due to the weight and size of the elongate support, removal and reinstallation may require several operators and/or mechanical assistance.

Belt cleaners are known that include cleaner blades configured to be laterally translated along the elongate member, thereby allowing an operator to remove and replace the cleaner blades out from under the conveyor belt without having to remove the elongate support member. In other belt cleaners, the scraper blades are mounted onto a removable cartridge member or rail member. In one such configuration, such as described in U.S. Pat. No. 6,581,754 to Law, the rail member defines a cavity extending along its length to receive the elongate support therein. The belt scraper assembly is configured to have clearance between the larger rail member cavity and the smaller elongate support extending along the lengths thereof. The clearance eases installation of the rail member on the elongate support and minimizes friction therebetween. However, it is possible for material removed from the conveyor belt to collect in the clearance. Material accumulated in the clearance can adhere to both the rail member and the elongate support along the lengths thereof and can effectively bind the rail member to the support so that the belt cleaner cannot be easily manually removed if it is able to be manually removed at all. As a result, an operator must provide sufficient force to overcome the strength of the material adhering the rail member to the elongate support, such as by application of multiple mallet blows to the end of the rail member.

Thus, prior belt cleaner assemblies suffer from problems with providing simple and quick maintenance in an environment which is subjected to loose, and often wet and sticky material passing therethrough.

SUMMARY

In accordance with one aspect of the invention, a removable cartridge cleaner assembly is provided that allows for faster and easier installation and removal of the belt cleaner blades out from under the conveyor belt. The present removable cartridge cleaner provides a releasable connection having a covered or sheltered connection between the removable cartridge assembly and the elongate support assembly to avoid the exposure of the connection to debris from the conveyor belt that may otherwise accumulate in and around the connection as in certain prior cartridge cleaner assemblies which have an exposed connection or connections and/or a loose fit between the removable rail members and the elongate support member, thereby providing spaces and/or gaps which allow debris and other material to collect therein. Such debris solidifies over time and can effectively glue the removable cartridge in place. The removable cartridge cleaner assembly and the releasable connection thereof are also particularly suitable for heavy-duty and fast-moving conveyor belt applications where the loads exerted on the cleaner assembly are particularly high.

The present removable cartridge cleaner assembly includes a cartridge assembly having an elongate base member which is removably mounted to an elongate support assembly. The elongate base member of the cartridge and elongate support assembly can be configured to matingly engage with one another, with a lower mating surface of the elongate base member matingly or conformingly engaged with an upper mating surface of the elongate support assembly. The elongate base member preferably includes one or more fixation elements such as fastening or securing projections for being received in one or more corresponding openings in the elongate support assembly. The receipt of the fixation elements in the corresponding openings blocks the base member from sliding along the length of the elongate support assembly via the engaged mating surfaces thereof. The fixation elements include openings that are aligned along a common axis and are sized and configured to receive one or more rod members therethrough. The receipt of the rod member in the aligned fixation element openings keeps the fixation elements from being removed from the corresponding openings in the elongate support assembly thereby keeping the cartridge from separating from the elongate support assembly. In this manner, the rod member is operable to secure the cartridge to the elongate support assembly in an operative position thereof. Further, the elongate rod member may be disposed substantially entirely within a chamber of the elongate support assembly with the exception of one or both end portions thereof. To this end, the fixation elements are disposed in the chamber when received in the corresponding openings, such as slots, of the elongate support assembly.

In one form, the removable cartridge cleaner assembly includes an elongate cartridge assembly configured for having at least one cleaner blade assembly fixed thereto and an elongate support assembly configured for supporting and securing the elongate cartridge assembly adjacent to and laterally across the conveyor belt. The elongate cartridge assembly includes a lower engaging portion for engaging and being supported by the elongate support assembly and may include a fastening projection extending therefrom, the fastening projection including a through-opening extending in the lateral direction. The elongate support assembly has an upper engaging portion for engaging the lower engaging portion of the elongate cartridge assembly. The upper engaging portion also may include at least one opening for receiving the fastening projection of the elongate cartridge assembly. An elongate rod member is configured to be received in the through-opening of the fastening projection with the rod member oriented to extend in the lateral direction for securing the elongate cartridge assembly to the elongate support assembly in an operative or secured position.

The lower engaging portion of the elongate cartridge assembly may have a plurality of fastening projections extending therefrom and spaced therealong that are used for fixing the elongate cartridge assembly to the support assembly. Each of the fastening projections may include a through-opening therein, and in the operative position the through-openings are aligned along an axis extending in the lateral direction across the transverse width of the conveyor belt for receiving the elongate rod member therethrough. Similarly, the upper engaging portion of the elongate support assembly may include a plurality of openings therein spaced from each other along the elongate support assembly for receiving the plurality of fastening projections of the elongate cartridge assembly.

In one form, the lower engaging portion of the elongate cartridge assembly may have a non-linear cross-section from one free end or side of the cartridge assembly to the other in a plane orthogonal to the longitudinal axis of the elongate cartridge assembly for engaging and being supported by the elongate support assembly. Similarly, the upper engaging portion of the elongate support assembly may have a corresponding non-linear cross-section in a plane orthogonal to the longitudinal axis of the elongate support assembly for engaging the lower engaging portion of the elongate cartridge assembly with a conforming fit. For example, the non-linear cross section can be an L, V, or U-shaped cross section, or an arcuate cross-section.

Preferably, the lower engaging portion of the elongate cartridge assembly and the upper engaging portion of the elongate support assembly are mating portions that have complimentary shapes such that the upper engaging portion of the elongate support assembly is in a nested configuration or in conforming engagement with the lower engaging portion of the elongate cartridge assembly when in the operative position for protecting the fastening projection or projections from debris removed from the conveyor belt, and for providing a rigid and durable connection between the cartridge assembly and the support assembly.

The lower engaging portion of the elongate cartridge assembly has an inner surface and may include first and second leg portions, such as of an angle bar that so that the leg portions meet at a corner juncture therebetween with each leg portion having an inner surface portion of the inner surface of the lower engaging portion. Further, one or more fastening projections may extend between and be connected to both the inner surface portions of the first and second leg portions. The upper engaging portion of the elongate support assembly may similarly be configured with first and second leg portions, such as of an angle bar that meet at a corner juncture therebetween and extend away from the corner juncture transversely to each other for mating with the lower engaging portion of the elongate cartridge assembly. The corner junctures of the lower and upper engaging portions each may be an upper junction with the respective leg portions extending down and away therefrom.

In one form, the elongate support assembly includes end stub shafts or tubes each having a mounting flange disposed at an inner end thereof for mounting to corresponding mounting flanges at either end of a central elongate support shaft of the elongate support assembly. The mounting flanges may be provided with a rod-receiving through-aperture aligned with the fastening projection through-openings for receiving the rod member therethrough for completing and securing the releasable connection between the cartridge assembly and the support assembly.

The elongate support member may also include at least one secondary cartridge support portion. The secondary cartridge support may be disposed adjacent to the upper engaging portion for supporting the elongate cartridge assembly adjacent to the upper engaging portion in an inoperative position. Preferably, the secondary cartridge support includes a plurality of narrow support surfaces that are arranged and configured to allow the elongate cartridge assembly to be supported for sliding across the narrow support surfaces during the installation and removal procedures for the removable cartridge cleaner herein. In this regard, narrow support surfaces can extend in a transverse direction to the length of the elongate cartridge assembly. In this manner, the surface area of engagement between the narrow support surfaces and the elongate cartridge assembly is kept to a minimum to provide for ease of sliding of the elongate cartridge assembly across the support surfaces. In one form, the secondary cartridge support includes a plurality of plate-like projections with the narrow support surfaces being narrow edge surfaces of the plate-like projections.

In another form, the releasable connection of the elongate cartridge assembly to the elongate support assembly is disposed in a longitudinally extending chamber that extends along the length of the elongate cartridge assembly such that the releasable connection is protected from fouling by conveyor belt debris released from the conveyor belt. The chamber may have a variety of cross-sectional shapes, such as a generally triangular cross-sectional area in a plane perpendicular to the longitudinal extent thereof with the longitudinal length extending in the width direction of the conveyor belt laterally thereacross so that the plane extends in the longitudinal travel direction of the conveyor belt. The elongate support member or a mounting flange thereof may include a rod-receiving through-aperture disposed at one or both ends of the chamber for receiving an elongate rod member therethrough. The releasable connection may include at least the portion of the elongate rod member that extends along a length of the elongate cartridge assembly when fixing the elongate cartridge assembly to the elongate support assembly.

In another form, a cartridge assembly for a conveyor belt cleaning assembly includes an elongate base member configured for being mounted to an elongate support member, the elongate base member extending along a longitudinal axis and having a belt-facing side and an opposite elongate support member-facing side. A belt cleaner blade assembly is mounted to extend from the belt-facing side of the elongate base member for scraping a conveyor belt. In addition, at least one fastening projection may extend from the support member-facing side of the elongate base member, which includes a through-opening having a central axis that extends longitudinally. In this regard, the central axis can be parallel to or aligned with the longitudinal axis of the elongate base member. The belt cleaner blade assembly may include a belt cleaner blade having an elongate, unitary main body of resilient material.

DETAILED DESCRIPTION OF THE PREFERRED EMBODIMENTS

Figure 1:
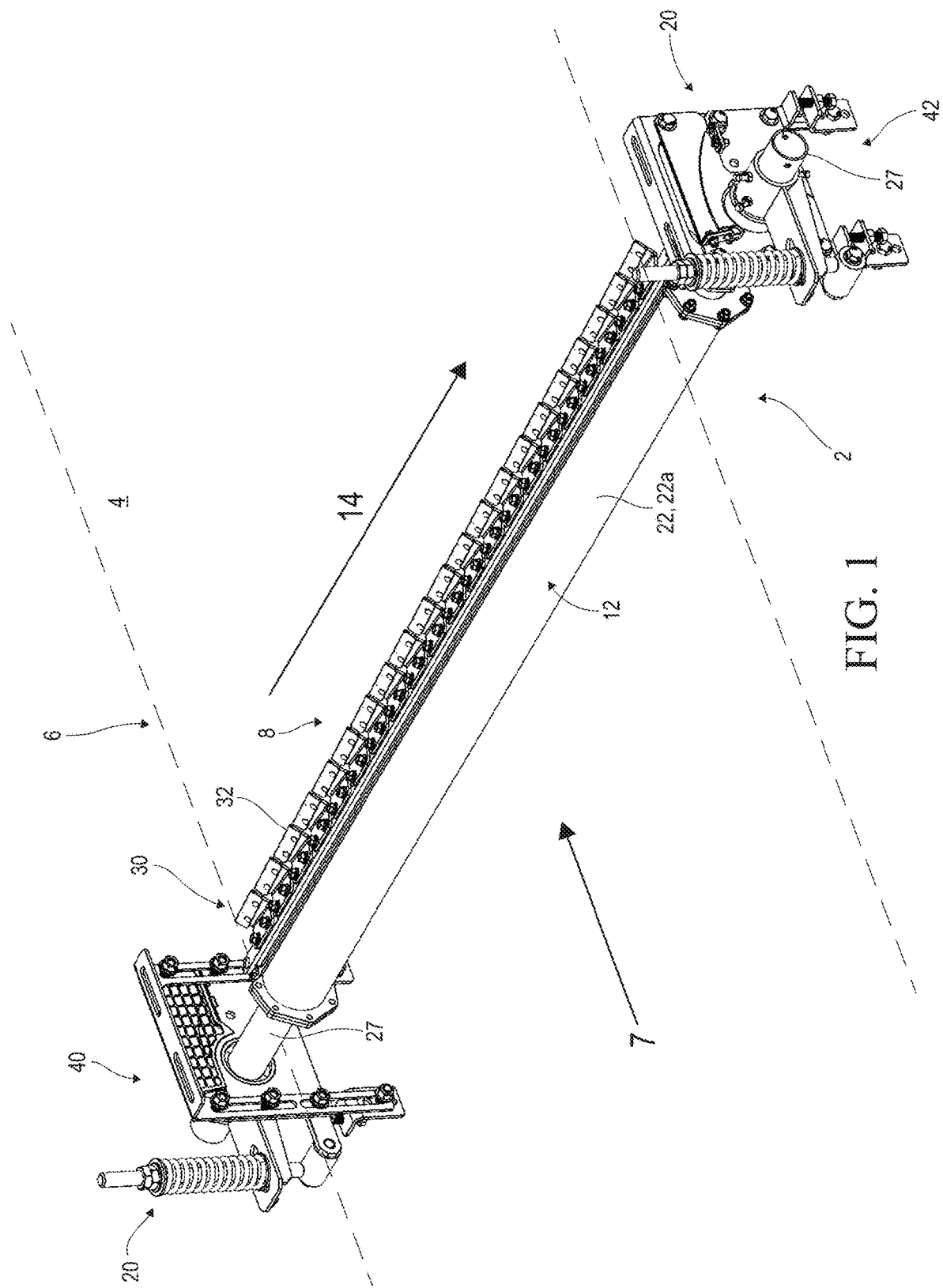
FIG. 1 is a perspective view of a removable cartridge cleaner assembly resiliently mounted below the return run of a conveyor belt shown in phantom.
Figure 2:
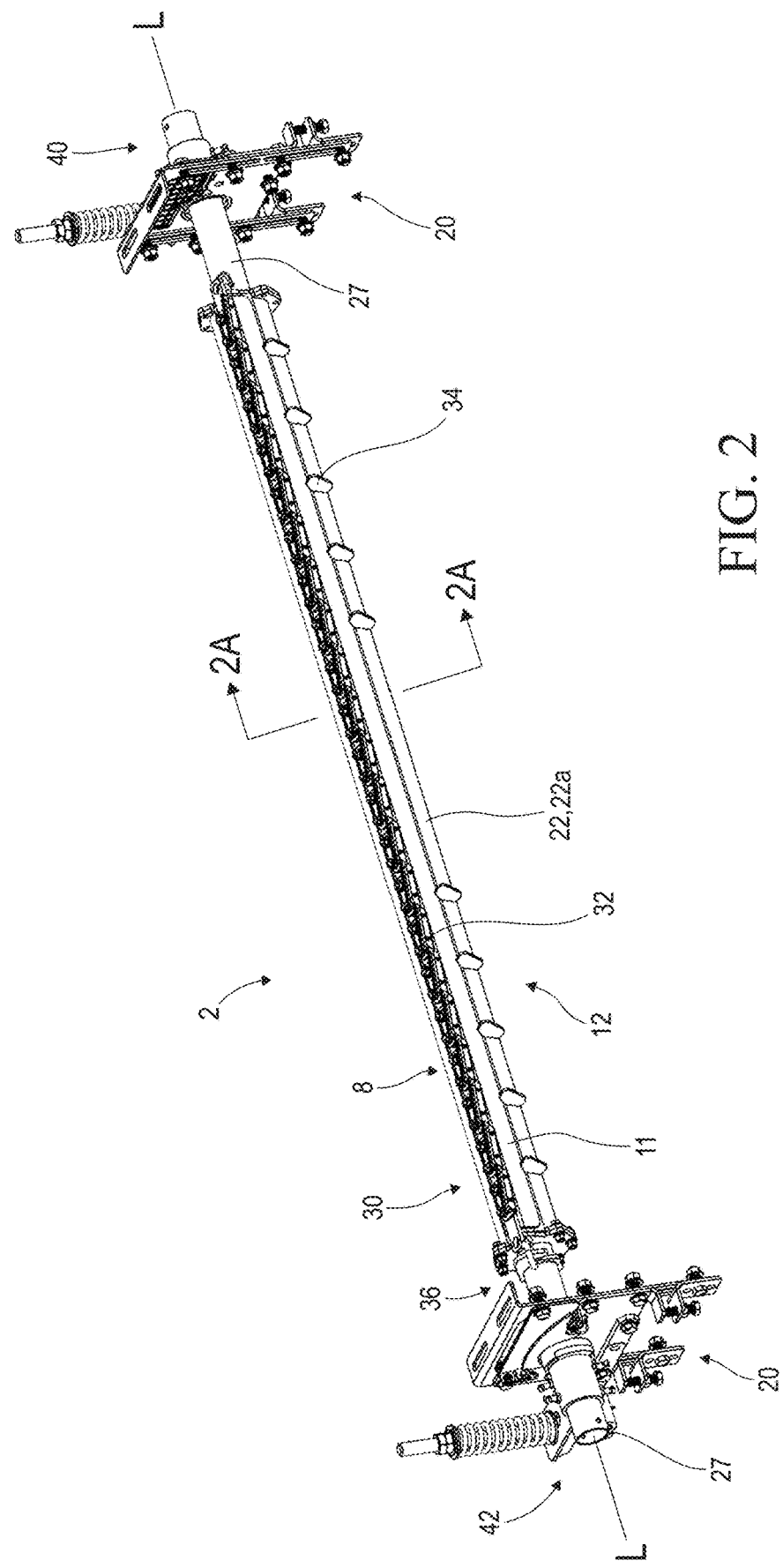
FIG. 2 is a perspective view of the removable cartridge cleaner assembly of FIG. 1 in an operative position showing the downstream side thereof.
Figure 2A:
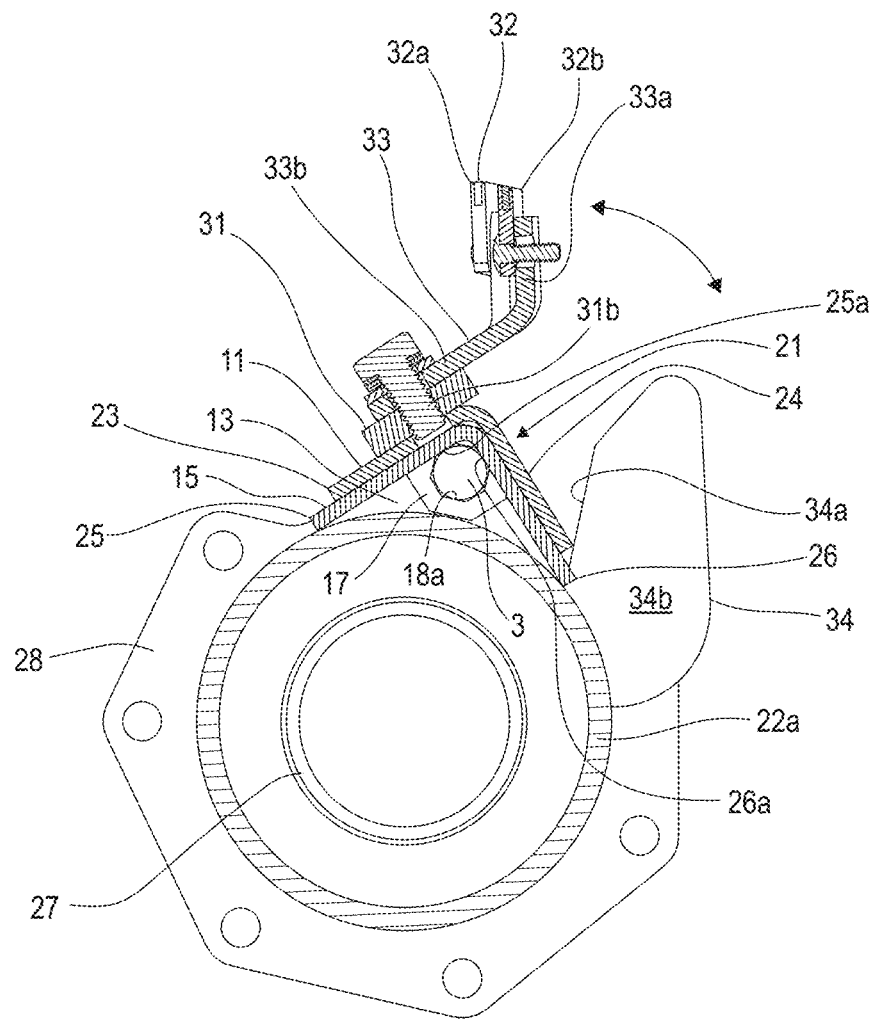
FIG. 2A is a cross-sectional view of the removable cartridge cleaner assembly of FIG. 1 taken along line 2A-2A in FIG. 2 showing a releasable connection between a cartridge assembly and an elongate support assembly of the removable cartridge cleaner assembly including a securing rod received in an opening of one of a plurality of fastening projections of the cartridge assembly.

Individual components and assemblies of the described embodiments and features thereof are generally described herein with respect to their own axes of orientation unless otherwise noted. As shown in FIGS. 1 and 2, a removable cartridge cleaner assembly 2 is installed in an operable position, wherein the longitudinal axis L of the removable cartridge cleaner assembly 2 is oriented transversely across the conveyor belt 4. As shown in FIGS. 1-9, a removable cartridge cleaner assembly 2 is shown for a conveyor belt 4 that can be located adjacent the return run 6 or the head pulley of the conveyor belt 4. As shown in FIGS. 1 and 9, the removable cartridge cleaner assembly 2 includes a cartridge assembly 8 having a lower mounting portion 9 for releasable engagement with an upper cartridge mounting portion 10 of an elongate support assembly 12 extending in a lateral assembly direction 14 under and across the conveyor belt 4 and perpendicular to the belt travel direction 7. As shown in FIG. 2A, the cartridge assembly 8 and elongate support assembly 12 are releasably connected to one another via a releasable connection 21 which includes fastening projections that are configured to releasably connect the cartridge assembly 8 to the elongate support assembly 12. The releasable connection 21 including the fastening projections 16 thereof are preferably entirely shielded from debris that is scraped from or otherwise dropped from the belt 4 due to their being sheltered by the cartridge assembly 8 and/or the elongate support assembly.

The removable cartridge cleaner assembly 2 is operable to engage the conveyor belt 4 and minimize damage thereto. For this purpose, the removable cartridge cleaner assembly 2 includes a resilient mount 20 at either end of the elongate support assembly 12. The mounts 20 are configured to bias one or more belt cleaner blades 32 of the cartridge assembly 8 into engagement with the belt 4 and permit limited rotational movement of the elongate support assembly 12 and cartridge assembly 8 to both maximize debris removal and minimize damage to the belt 4 and minimize wear and vibration of the removable cartridge cleaner assembly 2. As discussed herein, the removable cartridge cleaner assembly 2 is positioned adjacent the return run 6 of the belt 4, however placement of the removable cartridge cleaner assembly 2 adjacent the pulleys is contemplated.

As shown in FIGS. 1 and 2, the support assembly 12 as disclosed herein includes a central elongate support portion 22 including tube section 22a, which in turn is mounted via flanges 28 disposed at either end thereof to corresponding flanges 29 of lateral support members, such as lateral support tubes or end stub shafts 27. The lateral support tubes 27 are mounted to the resilient mounts 20 in a rotatable manner. One benefit of providing the central elongate support portion 22 separately from the lateral support tubes 27 is that the same lateral support tubes 27 and resilient mounts 20 may be used for conveyor belts of different lengths by modifying the length of the central elongate support portion 22. In an alternate embodiment, the central elongate support portion 22 can include integrally formed tube ends so that the central elongate support portion 22 could be directly connected to the resilient mounts 20 at either end.

Figure 7:
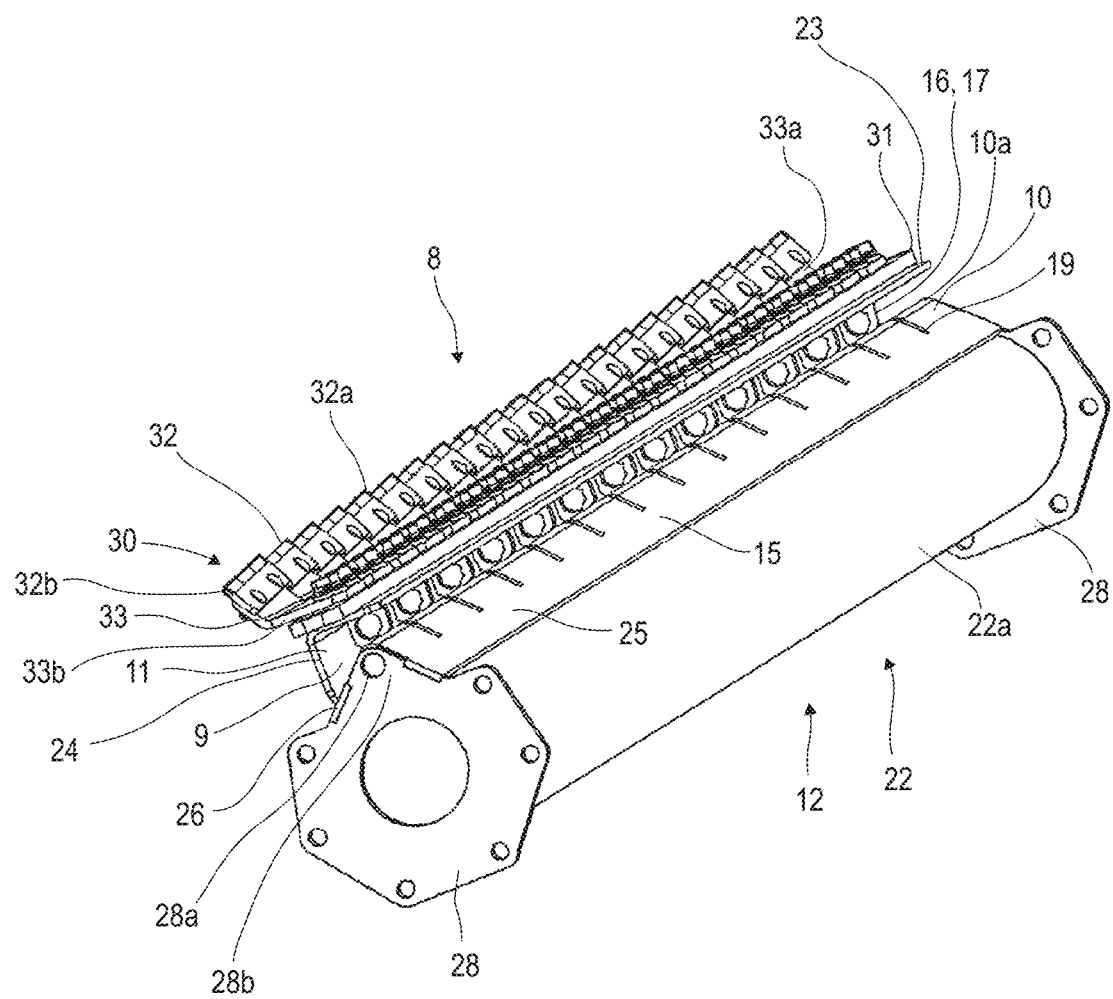
FIG. 7 is a perspective view of a central portion of the removable cartridge cleaner assembly of FIG. 1 with the rod removed and the cartridge assembly shifted from its operative position to an inoperative staging position supported by secondary cartridge support members of a central portion of the elongate support assembly and exposing the plurality of fastening projections of the cartridge assembly.

As shown in FIG. 7, the central elongate support portion 22 includes an upper cartridge mounting portion 10 for receiving and supporting the cartridge assembly 8. The upper cartridge mounting portion 10 is preferably configured to house the releasable connection 21 between the cartridge assembly 8 and the support assembly 12. The upper cartridge mounting portion 10 preferably has a non-linear cross-section and in one form is embodied by a V, U, or L-shaped member 15, such as an L-shaped angle bar having first and second leg portions 25, 26 extending downwardly from a corner juncture 10a. In the form disclosed, the first and second leg portions 25, 26 define a right angle therebetween. In one form, the L-shaped member 15 is connected to the central tube member 22a via welding. In another form, the L-shaped member 15 could be integrally formed with the central tube member 22a. The upper cartridge mounting portion 10 includes an array of spaced-apart slots or through-openings 19 that are sized and configured to receiving fastening projections 16 of the cartridge assembly 8. The slots 19 provide access to the chamber 13 and are centered on and oriented transversely with respect to the apex or corner juncture 10a of the upper cartridge mounting portion 10. The slots 19 extend downwardly on either side of the corner juncture 10a along the first and second leg portions 25, 26. In another form, the L-shaped member 15 can be omitted and the upper cartridge mounting portion 10 formed by an upper arcuate portion of central tube member 22a, and the lower mounting portion 9 of the cartridge assembly 8 be formed by a corresponding arcuate-shaped member instead of a V or L-shaped base member 11. In this form, the slots or through-openings 19 are formed in the upper arcuate portion of the central tube member 22a and the chamber 13 is disposed within the central tube member 22a.

The flanges 28 fixed to each end of the central tube member 22a include an upper portion 28b with a rod-receiving opening 28a for receiving rod 3 therethrough. The upper portion 28b of the flanges 28 has a generally triangular shaped area and acts as a side wall for the chamber 13 formed between the L-shaped member 15 and the central tube member 22a (see FIG. 2A), and prevents dust and debris from entering the chamber 13 from either end of the central tube member 22a and fouling the releasable connection 21 which resides therein.

Figure 10:
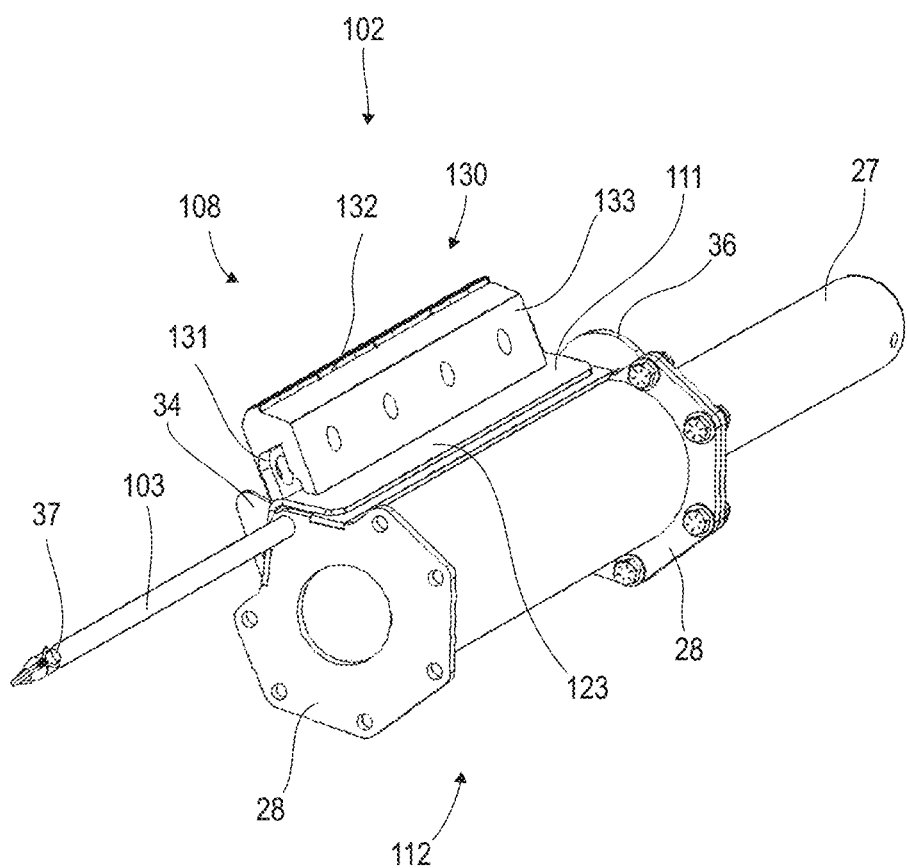
FIG. 10 is a perspective view of an alternate embodiment of a removable cartridge cleaner assembly showing a central portion of an alternate cartridge assembly with the hard cleaning blades partially embedded in a resilient body of material forming an integrated cleaning blade assembly.
Figure 11:
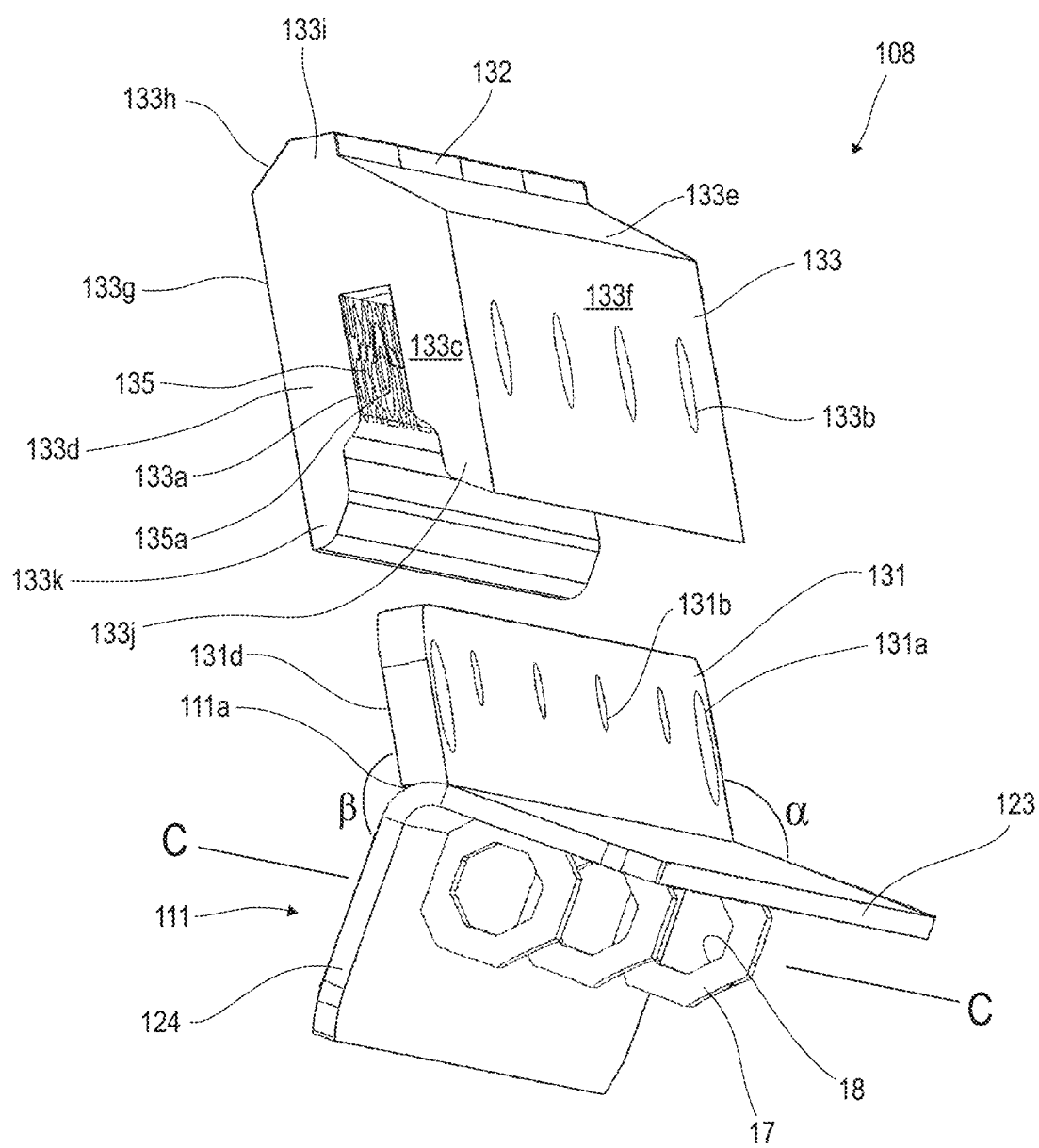
FIG. 11 is a perspective view of the cartridge assembly of FIG. 10 with the blade assembly removed from cartridge assembly.

As shown in FIGS. 1 and 2A, the cartridge assembly 8 includes one or more belt cleaner blade assemblies 30 that are mounted to a flat bar member 31, and the flat bar member 31 is mounted to a base member 11. The belt cleaner blade assembly includes a blade 32 mounted to a biasing mechanism 33, such as a bent plate member having an inclined blade mounting portion 33a which supports the blade 32 in contact with the belt with a leading end of the blade 32a slightly upstream from the opposite trailing end of the blade 32b, and a lower cartridge mounting portion 33b which is mounted to the flat bar member 31. This arrangement allows a partial overlap of adjacent blade ends 32a, 32b such that the leading end 32a of one blade 32 may be positioned directly upstream from the trailing end 32b of an adjacent blade 32. The belt cleaner blade assemblies 30 can include other known scraper blades and biasing mechanisms used in belt cleaning assemblies. The belt cleaner blade assembly 30 may also be of an integrated design as shown in FIGS. 10 and 11, wherein the blade or blades 32 and/or the biasing mechanisms 33 thereof are at least partially embedded in a main body of unitary resilient material, such as polyurethane. The blade or blades 32 are preferably made of a harder material than the resilient material, such as steel.

Further, as shown in FIG. 9, the flat bar member 31 extends beyond the length of the base member 11 on either end thereof and includes through-openings 31a, which may be used to assist with lifting and transporting the cartridge assembly 8. Further, the flat bar member 31 includes a series of belt cleaner blade assembly mounting apertures 31b for mounting the cleaner blades assemblies 30 with fasteners thereto.

The base member 11 of the cartridge assembly 8 is configured to extend across and below the belt 4 such that the belt cleaner blade assemblies 30 are positioned to be engaged with the belt 4 along the width thereof. The base member 11 preferably is configured to protect the releasable connection 21 from dust and debris. The base member 11 has a non-linear cross section, such as a v or L-shaped configuration and can be formed by an L-shaped angle bar having first and second leg portions 23, 24. In the form disclosed, the first and second leg portions 25, 26 define a right angle therebetween, although other configurations are contemplated. The inner surfaces of the first and second leg portions 23, 24, along with the downwardly extending fastening projections 16 form the lower mounting portion 9 for mounting the cartridge assembly 8 to the upper cartridge mounting portion 10 of the support assembly 12.

As shown in FIGS. 7 and 9, the fastening projections 16 of the cartridge assembly 8 in one form include loop or ring-shaped members 17 that each have a through-opening 18 disposed therein. The loop or ring-shaped members 17 may be formed from plate-like members having opposite parallel sides and an octagonal periphery, although other suitable shapes are contemplated. In other forms, the fastening projections 16 may be formed by elongate tubing, such as round, square, or rectangular tube sections. Alternatively, the cartridge assembly 8 may have a single fastening projection, such as an elongate tube section. In this configuration, the support assembly 12 is provided with a single corresponding elongate opening.

The through-openings 18 extend between the parallel sides of the loop members 17 and may also have an octagonal configuration, or other configuration such as a circular shape that approximates the outer profile of the rod member 3. The through-openings 18 are aligned along a common central axis C for receiving one or more elongate pins or rods 3 (see FIG. 6) therethrough when the cartridge assembly 8 is mounted to the support assembly 12 in an operative position. For example, instead of a single rod 3 extending through each of the through-openings, two separate rods 3 could be inserted at either end of the support assembly 12. A single rod 3 could also be formed of multiple pieces that can be fixed together, such as through a threaded connection. The through-openings 18 may be larger than the outer diameter of the rod 3 so long as there is a tight fit between the rod 3 and the interior surfaces 25a, 26a of the first and second leg portions of L-shaped member 15 when the releasable connection 21 is made, as describe in more detail with respect to FIG. 2a below.

The loop-shaped members 17 are configured to be received in corresponding slots 19 in the upper cartridge mounting portion 10 of the elongate support assembly 12. Both the loop-shaped members 17 and the corresponding slots 19 are preferably uniformly spaced apart from one another such that when the loop-shaped members 17 are aligned with the corresponding through-openings 19, the loop-shaped members 17 may be lowered or rotated from the staging position shown in FIGS. 7 and 8 into and through the corresponding slots 19 and into the at least partially enclosed chamber 13, as shown in FIG. 2A. When the loop-shaped members 17 are fully inserted through the corresponding slots 19, the base member 11 and the lower mounting portion 9 thereof of the cartridge assembly 8 completely covers the upper mounting portion 10 and the slots 19 therein of the support assembly 12 to prevent debris from fouling the releasable connection 21 between the cartridge assembly 8 and the support assembly 12. The releasable connection 21 is also sheltered from debris due to its position within the chamber 13, which is formed between the upper mounting portion 10 and the elongate tube member 22a. As shown in FIG. 2A, the chamber has a generally triangular cross-section, with the lower border of the chamber being formed by an arc-shaped portion of the central tube member 22a.

The cartridge assembly 8, the support assembly 12, and the releasable connection 21 therebetween are further configured to minimize or eliminate accumulation of dust and debris which can cause the assemblies 8, 12 to bind together over time, making removal of the cartridge assembly 8 difficult. In the disclosed embodiments, the lower mounting portion 9 of the cartridge assembly 8 and the upper cartridge mounting portion 10 of the support assembly 12 have complimentary shapes to allow a close fit therebetween, such as the nested configuration shown in FIG. 2A. The tight engagement of the cartridge and support assemblies 8, 12 minimizes vibration and space between the mounting portions 9, 10 thereof, thereby minimizing or eliminating the space available for debris accumulation. An additional advantage provided by the L-shaped base member 11 is that debris falling from above is directed away from the cartridge assembly 8 and the releasable connection 21 with the support assembly 12 due to the orientation of the base member 11 with the first and second leg portions 23, 24 extending downwardly at an oblique angle away from the belt 4. The L-shaped base member 11, as well as the L-shaped upper cartridge mounting portion 12 of elongate support assembly 12 advantageously lack significant horizontal flat surfaces on which dust and debris may readily accumulate.

Referring to FIG. 2A, the releasable connection 21 is firmly maintained by ensuring that the rod 3 engages the interior surfaces 25a, 25b of the first and second leg portions 25, 26 close to the apex 10a of the upper cartridge mounting portion 10. At the same time, the rod 3 should engage at least a lower inner surface 18a of the through-opening 18. Further, the lower mounting portion 9 of the base member 11 of the cartridge assembly 8 should conformingly engage the upper cartridge mounting portion 10. The loop members 17 may also be sized and configured to engage with the outer surface of the central tube member 22a to provide another support point. These various contact points provide a tight, strong, and reliable connection between the cartridge assembly 8 and the support assembly 12 that is completely protected from fouling by dust and debris.

Figure 8:
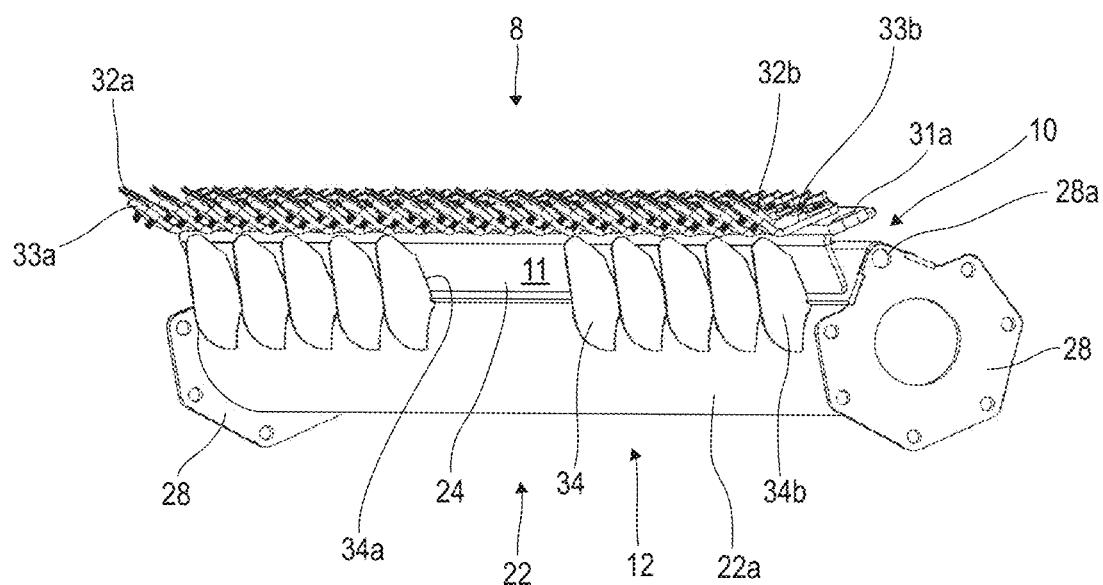
FIG. 8 is a perspective view showing the secondary cartridge support members spaced along the central portion of the elongate support assembly for allowing the cartridge assembly to be slid across the support members during installation and removal of the cartridge assembly.
Figure 9:
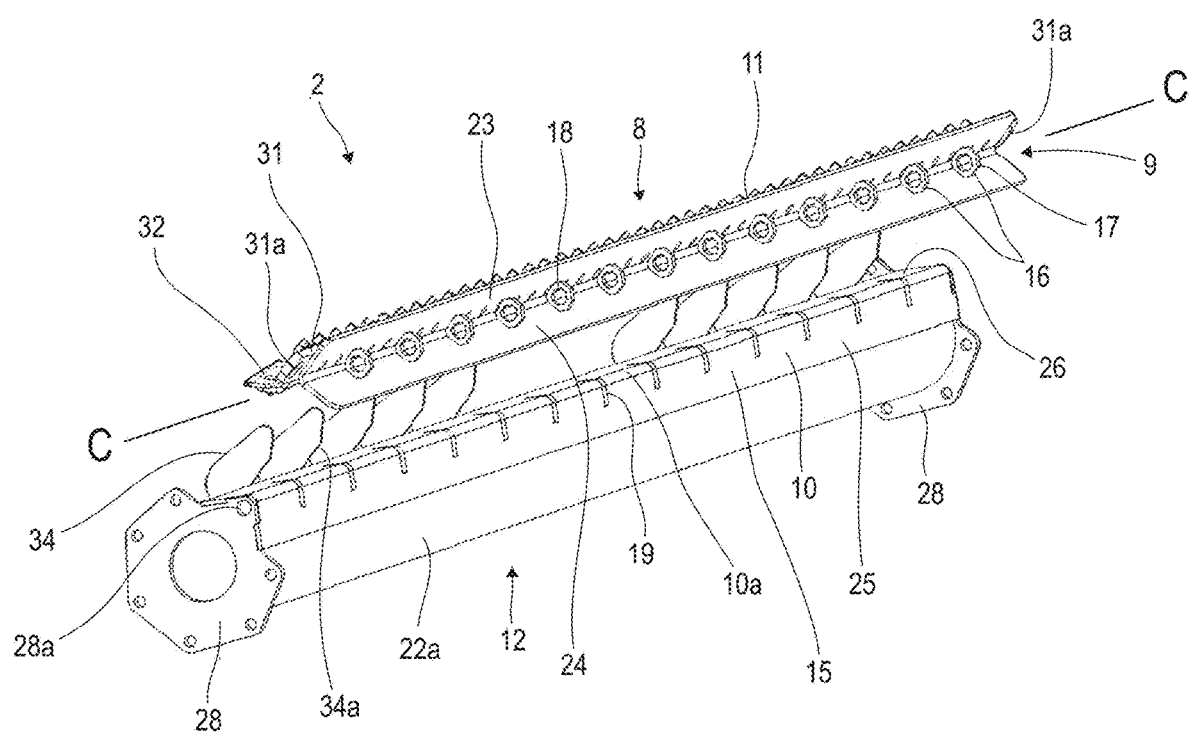
FIG. 9 is a perspective view of the cartridge assembly removed from the central portion of the elongate support assembly so that the lower side of the cartridge assembly is visible to show the fastening projections of the cartridge assembly and corresponding slot openings of the elongate support assembly which are configured to receive the fastening projections.

As shown in FIGS. 2, 2A and 8, to assist with installation and removal of the cartridge assembly 8, the elongate support assembly 12 includes a secondary cartridge support, such as a plurality of upwardly extending fins or plate-like projections 34 for temporarily supporting the cartridge assembly 8 adjacent to the upper engaging portion 10 with the cartridge assembly 8 in an inoperative or staging position. The plate-like projections 34 have opposing flat side surfaces 34b that are oriented transversely to a longitudinal axis L of the elongate support member 12. As shown in FIG. 2A, the plate like projections 34 include an obliquely extending support surface or edge 34a that extends outwardly and upwardly from the central tube member 22a for supporting the second leg portion 24 of the base member 11. The oblique support surface 34a is oriented to allow the cartridge assembly 8 to be rotated about the end of the second leg portion 24 to allow the loop members 17 to become free of the slots 19 in the upper cartridge mounting portion 10. Then the cartridge assembly 8 may be removed from the support assembly 12.

The secondary cartridge support provides a low-friction sliding interface between the cartridge assembly 8 and the elongate support assembly 12 to allow one end of the cartridge assembly 8 to be placed thereon and then to be slid along the lateral assembly direction 14 into an inoperative staging or install position shown in FIGS. 7 and 8. Similarly, the cartridge assembly 8 may be slid out of the staging position and removed from support assembly 12 entirely without needing to lift the cartridge assembly 8 from the support assembly 12. Advantageously, the resilient support 20 is provided with a removeable cover 20a (See FIG. 5) to allow the cartridge assembly 8 and the rod 3 to be installed or removed from the support assembly 12 without need for the operator to be underneath the belt 4, which allows for increased safety.

Figure 3:
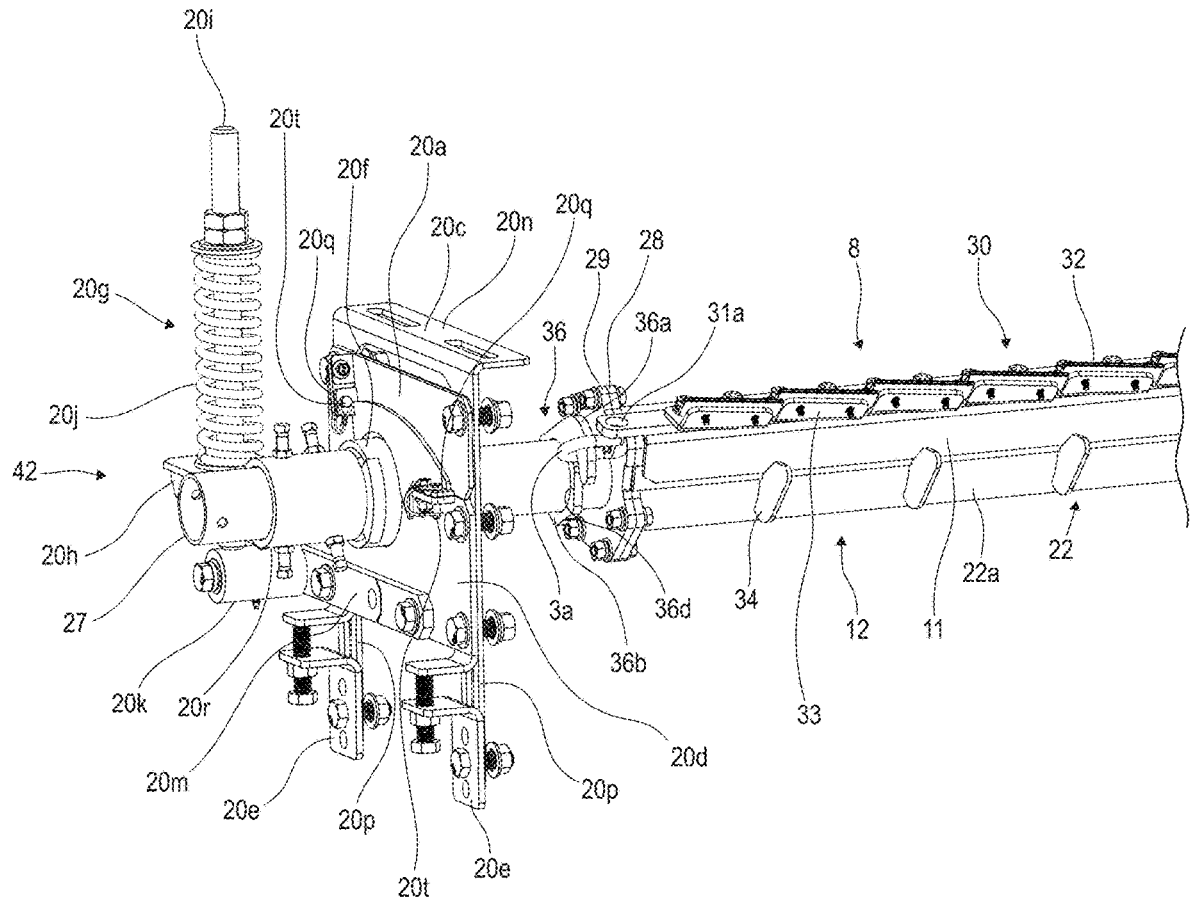
FIG. 3 is an enlarged perspective view of the removeable cartridge cleaner assembly of FIG. 1 showing a locking member in locking engagement with a looped end of the securing rod for fixation of the cartridge to the elongate support assembly.
Figure 4:
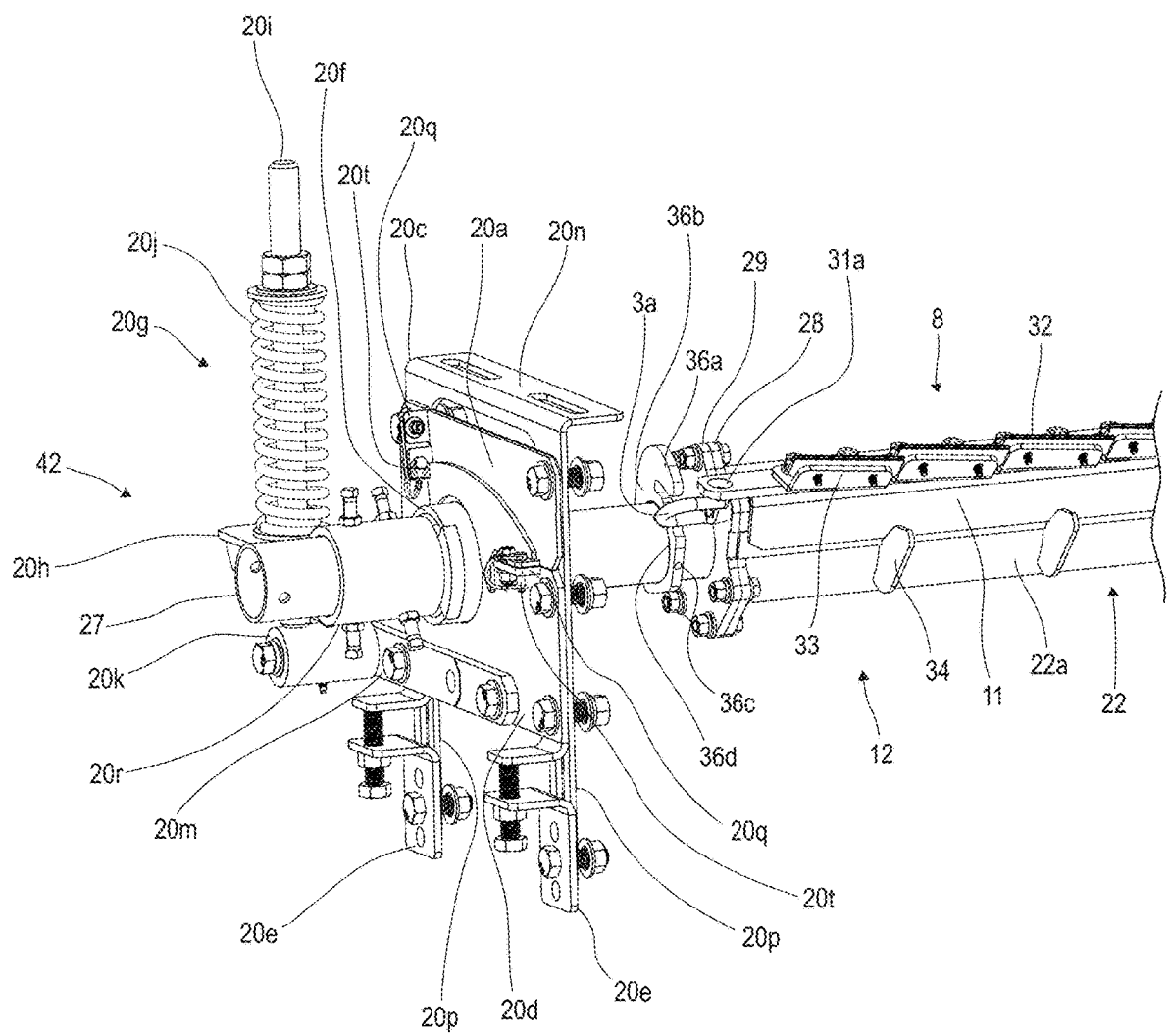
FIG. 4 is an enlarged perspective view of the removeable cartridge cleaner assembly of FIG. 1 showing the locking member in an unlocked orientation for allowing the securing rod to be removed from the fastening projections.
Figure 5:
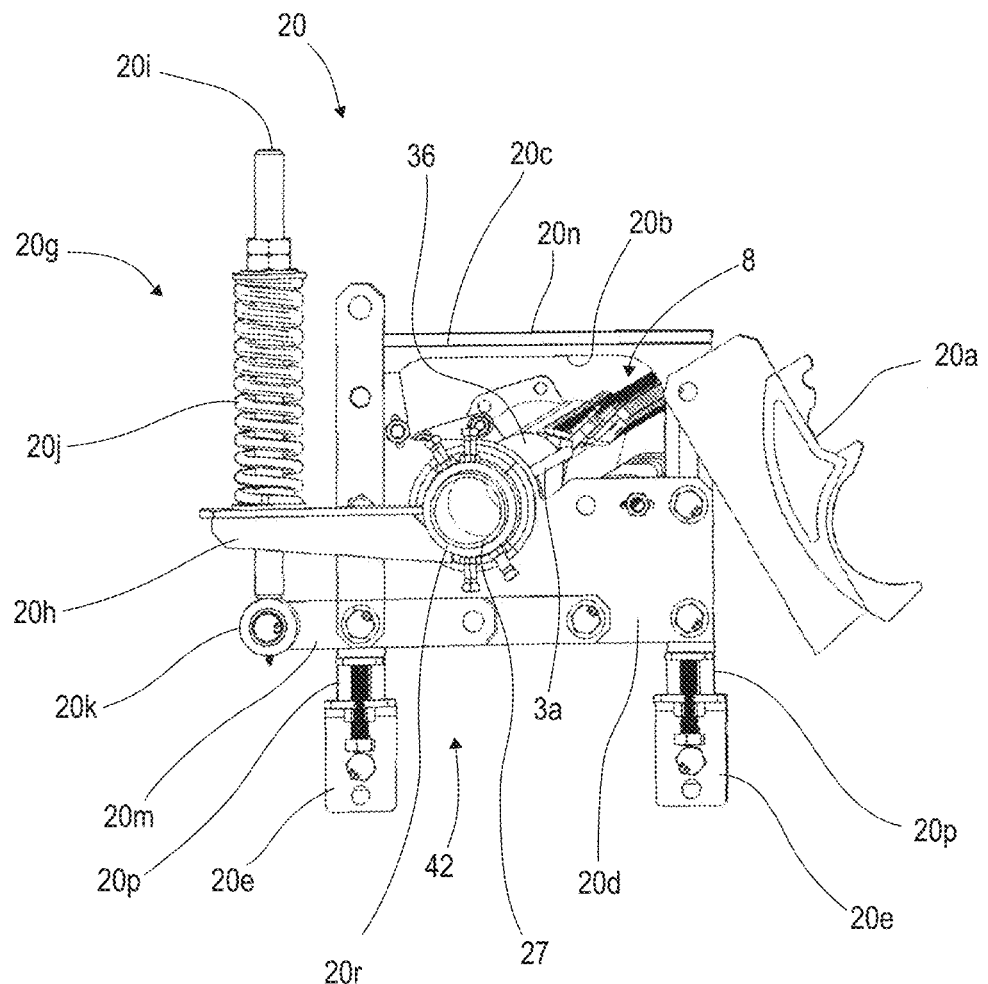
FIG. 5 is a perspective view of the removeable cartridge cleaner assembly of FIG. 1 showing a resilient mounting assembly at one longitudinal end of the removeable cartridge cleaner assembly with a cover shown in an open position to expose an opening in the resilient mounting assembly to allow the securing rod and cartridge assembly to pass therethrough.
Figure 6:
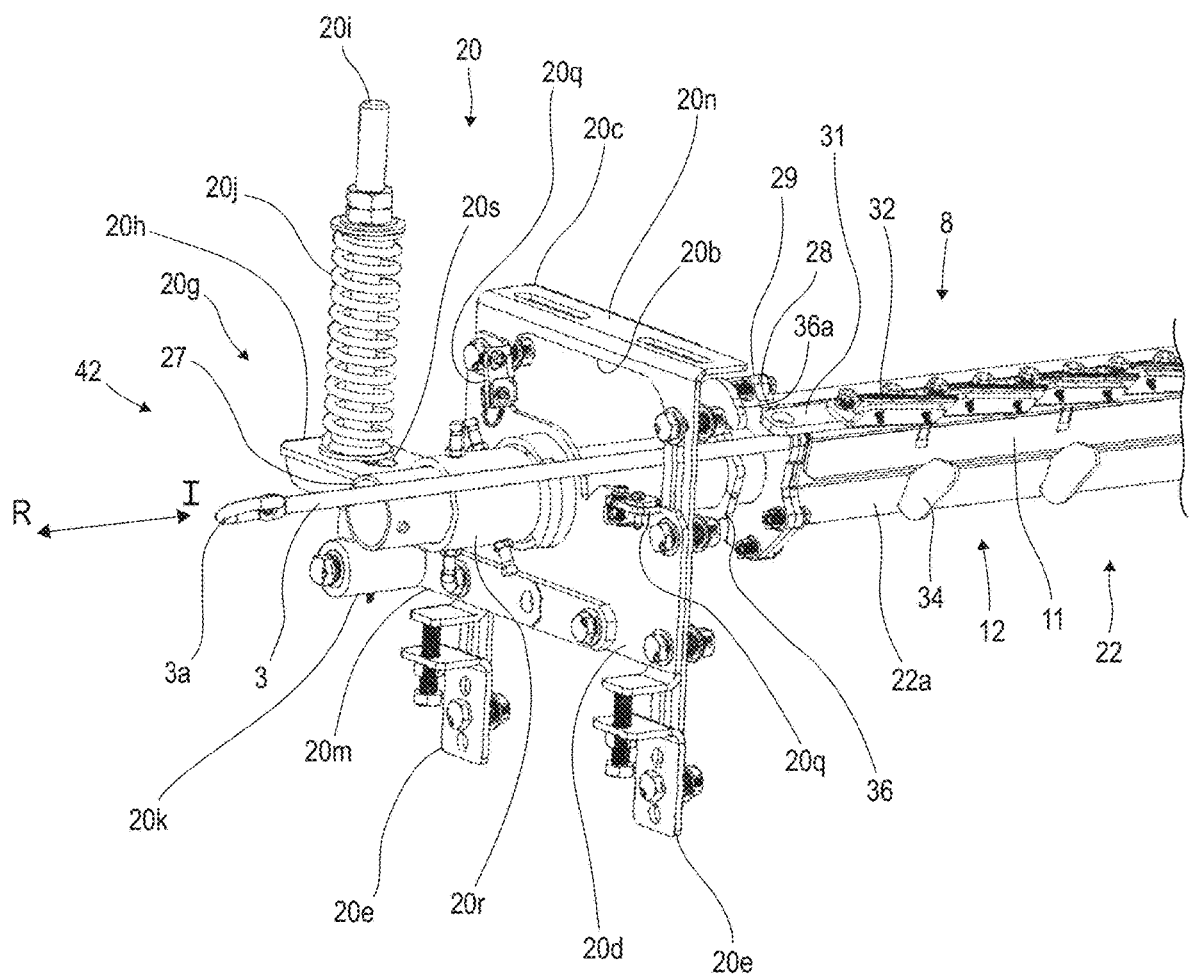
FIG. 6 is an enlarged perspective view of the removeable cartridge cleaner assembly of FIG. 1 showing the securing rod partially removed from the fastening projections along a longitudinal removal direction R, which is opposite from a longitudinal insertion direction I.

FIGS. 3-9 illustrate a method of removing a cartridge assembly 8 from the support assembly 12. First, the releasable connection 21 must be released. This is accomplished by removing the rod locking device 36 from the end loop 3a of the rod 3. The rod locking device 36 in the disclosed form includes a hook portion 36a and a plate-like body 36b that is releasably and rotatably mounted about one of the lateral support tubes 27 via a through-opening 36d in the plate-like body 36b. The rod locking device 36 may include one or more set screws 36c for fixing the rod locking device to the lateral support tube 27. Once the rod locking device 36 is released from the lateral support tube 27, it may be rotated counterclockwise to remove the hook portion 36a from the end loop 3a of the rod 3, as shown in FIG. 4. The opposite end of the rod 3 may also have a locking device such as a double-wire snap pin 37, which can be seen in FIG. 10. The pin 37 is inserted through an opening in the distal end of the rod 3 to prevent movement of the rod 3 along the longitudinal axis thereof in a removal direction R (see FIG. 6) should the rod locking device 36 fail to lock the rod 3 in place. Once the rod fixation members 36, 37 are removed from the rod 3, the rod 3 may be removed from the releasable connection 21 by pulling the rod 3 along the removal direction R until it is completely removed from the cartridge cleaner assembly 2. Removal of the rod 3 may be facilitated by removing or shifting the removeable cover 20a of the resilient mount 20 as shown in FIGS. 5 and 6.

Once the rod 3 is removed, the cartridge assembly 8 may be removed from the support member 12. This can be accomplished by pivoting or rotating the cartridge assembly 8 clockwise as shown in FIG. 2A about the end of the second leg portion 24 of the base member 11. The cartridge assembly 8 is rotated into the staging or install position shown in FIGS. 7 and 8, with the loop members 17 removed from the slots 19 of the upper cartridge mounting portion 10 and the outer surface of the second leg portion 24 engaged against the oblique support surfaces 34a of the secondary cartridge support fins 34. The second leg portion 24 is also supported in part by the second leg portion 26 of the upper cartridge mounting portion 11. Once in the staging position, the cartridge assembly 8 may be slid in the removal direction R along the sliding interface between the cartridge assembly 8 and the elongate support assembly 12 and out through the opening 20*b* provided in the resilient mount 20. The cartridge assembly 8 may also be removed by lifting the cartridge assembly upwardly from the support assembly 12, as shown in FIG. 9.

Installation of the cartridge assembly 8 may be done in the reverse order described above. First, as previously described, the support assembly 12 is positioned adjacent to and across the conveyor belt 4 and fixed in place using mounting assemblies such as resilient mounts 20. Next, one end of the cartridge assembly 8 is rested on the endmost proximate cartridge support fin 34 such that the cartridge assembly 8 is in sliding engagement therewith. The cartridge assembly 8 may then be shifted along a length of the support assembly 12 in the install direction I with the cartridge assembly 8 in sliding engagement with each successive cartridge support fin 34 and the central support tube 22 until the cartridge assembly 8 is in the install or staging position shown in FIGS. 7 and 8, which is adjacent to the operative position. In the install position, the plurality of fastening projections 16 of the cartridge assembly 8 are aligned with the corresponding openings or slots 19 in the upper cartridge mounting portion 10 of the support assembly 12. The cartridge assembly 8 may then be pivoted clockwise as shown in FIGS. 7 and 8 about the end of the second leg portion 24 of the base member 11, i.e. about an axis extending in the lateral direction coincident with the end of the second leg portion 24. The cartridge assembly 8 is pivoted until the lower mounting portion 9 of the cartridge assembly 8 and the upper cartridge mounting portion 10 of the support assembly 12 are in intimate mating engagement and the fastening projections 16 are extending through the corresponding slots 19 and into the chamber 13. The cartridge assembly 8 is then in the operative position and is secured against movement in at least the insertion and removal directions and the lateral assembly direction 14. To keep the cartridge assembly 8 from being separated from the support assembly 12, the rod 3 is inserted in the rod receiving opening 28*a* and through the aligned through-openings 18 of the fastening projections 16. The rod 3 is further secured against longitudinal shifting by rotating the rod locking device 36 into engagement with the looped end 3*a* of the rod with the hook portion 36*a* extending therethrough as shown in FIGS. 4 and 3. The opposite end of the rod 3 may also be secured, such as by a pin 37 as described above. The rod locking device 36 may then be fixed to the lateral support tube 27 via set screws 36*c* or other fasteners.

As shown in FIGS. 1 and 2, a resilient mount 20 is positioned adjacent either end 40, 42 of the elongate support assembly 12. The resilient mount 20 can be any known resilient mount 20, such as a spring tensioner. The resilient mount 20 is configured to permit shifting of the cartridge assembly 8 out from under the conveyor belt 4. As shown in FIGS. 3-6, the resilient mount 20 includes an inverted U-shaped bracket 20*c*, mounting plate 20*d*, l-shaped mounting plate support brackets 20*e*, removable cover 20*a*, bushing 20*f*, and spring tensioner assembly 20*g*. The spring tensioner assembly 20*g* includes torque arm 20*h*, threaded rod 20*i*, coil spring 20*j*, rotatable rod support 20*k* to which the bottom end of threaded rod 20*i* is fixed, and rod support arm 20*m*. The U-shaped bracket 20*c* includes a transverse upper base portion 20*n* and spaced leg portions 20*p* extending downwardly therefrom. The leg portions 20*p* are configured to define a space therebetween to permit the rod 3 and cartridge assembly 8 to pass therethrough. Mounting plate 20*d* is attached to and spans across the spaced leg portions 20*p*. The mounting plate 20*d* includes an aperture for receiving the bushing 20*f*, which in turn receives the lateral support tube 27 in a rotatable manner. The mounting plate 20*s* further includes removable cover mounting brackets 20*q* for securing the removeable cover 20*a* thereto. The removeable cover 20*a* is also attached to one of the leg portions 20*p* at an upper corner thereof and to one of the mounting brackets 20*q* at an opposite end thereof, as well as to the other mounting bracket 20*q* at a bottom corner thereof. By releasing fasteners such as pins 20*t*, the removable cover may be pivoted about its upper corner (See FIG. 5) to reveal opening 20*b* for allowing the cartridge assembly 8 and rod 3 to pass therethrough during installation or removal of the same. The removeable cover may then be reattached to reduce passage of dust and debris through the opening 20*b* and to further add rigidity to the resilient mount 20.

The torque arm 20*h* of the spring tensioner assembly includes a mounting tube 20*r* at one end which receives the lateral support tube 27 and is fixed thereto with set screws. The torque arm 20*h* includes a slot opening 20*s* (see FIG. 6) adjacent the opposite end for allowing threaded rod 20*i* to extend therethrough while also allowing the threaded rod 20*i* to rotate about rotatable rod support 20*k*, which is caused by the rotation of the torque arm 20*h* and the lateral support tube 27, such as when the belt cleaner blade 32 is struck by a splice in the belt 4. Coil spring 20*j* extends about the threaded rod 20*i* and is biased between the torque arm 20*h* at a bottom end of the spring and fastening members at a top end of the spring, the fastening members being threaded on the threaded shaft 20*i* near an upper end thereof. The fastening members may be adjusted up or down along the threaded rod 20*i* to decrease or increase the biasing force exerted by the spring 20*j* on the torque arm 20*h*. Other resilient mounts 20 can be utilized with the removable cartridge cleaner assembly 2. Preferably, alternative mounts 20 permit removal of the cartridge assembly 8 or at least the rod 3 therethrough.

An alternative removable cartridge cleaner assembly 102 will now be described with respect to FIGS. 10 and 11, which has an alternative cartridge assembly 108 having a shorter length than the cartridge assembly 8 of FIG. 1 which is suitable for a narrower conveyor belt than belt 4. The alternative removable cartridge cleaner assembly 102 is similar to that described with respect to FIGS. 1-9 except as discussed herein.

The support assembly 112 of FIG. 10 is similar to that of FIGS. 1-9, but has a shorter length suitable for a narrower conveyor belt. The resilient mounts 20 and one of the lateral support tubes 27 are not shown, but may be the same as those disclosed in FIG. 1. In FIG. 10, rod member 103 is shown partially removed from the releasable connection between the cartridge assembly 108 and the support assembly 112 in the opposite direction from the assembly direction 14 shown in FIG. 6, which may be accomplished by removing the loop end 3 from the rod 103 and pulling the rod 103 along its longitudinal axis.

The alternative cartridge assembly 108 has a single integrated belt cleaner blade assembly 130 in which the blades 132 and other supporting components are at least partially covered or embedded in a unitary main body or cover 133 of a resilient material, such as polyurethane. Such a configuration protects the internal components of the integrated blade assembly 130 from wear and fouling, and allows for simplified replacement thereof relative to multiple individual blade assemblies 30, which may include additional fasteners and which are also exposed or more exposed to fouling by dust and debris. Because the blades and other supporting components are embedded in a unitary main body of resilient material, the integrated belt cleaner blade assembly 130 cannot be disassembled without damaging or destroying the unitary main body 133.

Now referring to FIG. 11, the base member 111 of the cartridge assembly 108 is similar to the base member 11 shown in FIG. 7, which is formed from a V- or L shaped member, such as an L-shaped angle bar. The base member 111 is configured to mount to the support assembly 112 in the same way as base member 11 disclosed in FIGS. 1-9. The base member 111 includes three loop or ring-shaped members 17, which have generally octagonal through-openings 18, which are aligned along their central axis C. An upstanding bar-shaped blade assembly mounting portion 131 is connected to the apex 111a of the base member 111 slightly off center towards the second leg portion 124 such that the angle α between the top surface of the second leg portion 124 and the upstream facing surface 131c of the blade assembly mounting portion 131 is smaller than the angle β, between the top surface of the first leg portion 123 and the downstream facing surface 131d of the blade assembly mounting portion 131. The angles α and β, may be varied depending on the angle of attack desired for the blades relative to the belt 4. The blade assembly mounting portion 131 includes lift points in the form of larger apertures 131a at either end thereof and blade mounting apertures 131b for receiving fasteners such as pins (not shown) for mounting the cleaner blade assembly 130 to the blade assembly mounting portion 131. In each case the apertures 131a, 131b extend between upstream and downstream surfaces 131c, 131d of the blade assembly mounting portion 131.

The integrated cleaner blade assembly 130 includes blades 132 which are partially covered or embedded in unitary body 133. The unitary body 133 includes a central channel portion 133a between opposing upstream and downstream legs 133c, 133d that is sized and configured for receiving the upstanding blade assembly mounting portion 131. Internal blade support members 135 are embedded in the unitary body on either side of the blades 132 and the central channel portion 133a, one of which is visible in FIG. 11. Both the unitary body 133 and the internal blade support members 135 include corresponding transversely orient through-openings 133b, 135a that are arranged and configured to be aligned with the blade mounting apertures 131b in the blade assembly mounting portion 131 for receiving fasteners therein. The unitary body 133 further includes an obliquely oriented upstream surface 133e which extends between an upper edge of upstream side surface 133f and a lower exposed edge of the blades 132. The downstream side of the unitary body 133 includes downstream side surface 133g and an obliquely oriented downstream surface 133h which extends from the top edge of downstream side surface 133g to an upper surface 133i, which is generally planar with the top edge of blades 132. Upstream and downstream legs 133c, 133d include lower tapered portions 133j, 133k which taper respectively toward upstream and downstream side surfaces 133f, 133g. Both lower tapered portions 133j, 133k are configured respectively to contact upper surfaces of second and first leg portions 124, 123 to protect the blade assembly mounting portion 131 and a portion of the base member 111 from wear and fouling. Because of the offset mounting arrangement of blade assembly mounting portion 131, the lower tapered portion 135k of downstream leg 133d is longer than lower tapered portion 133j.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A removable cartridge cleaner assembly for cleaning a conveyor belt, comprising:
    an elongate cartridge assembly configured for having at least one cleaner blade assembly fixed thereto;
    an elongate support assembly configured for supporting the elongate cartridge assembly adjacent to and across the conveyor belt in a lateral direction transverse to a longitudinal belt travel direction;
    a lower engaging portion of the elongate cartridge assembly for engaging and being supported by the elongate support assembly;
    a fastening projection extending from the lower engaging portion of the elongate cartridge assembly, the fastening projection including a through-opening extending in the lateral direction;
    an upper engaging portion of the elongate support assembly for engaging the lower engaging portion of the elongate cartridge assembly;
    at least one opening in the upper engaging portion of the elongate support assembly for receiving the fastening projection of the elongate cartridge assembly; and
    an elongate rod member configured to be received in the through-opening of the fastening projection to extend along the lateral direction for securing the elongate cartridge assembly to the elongate support assembly.

2. The removable cartridge cleaner assembly of claim 1, wherein the fastening projection comprises a plurality of fastening projections extending from the lower engaging portion of the elongate cartridge assembly, the plurality of fastening projections including a plurality of corresponding through-openings therein, wherein the through-openings are aligned along an axis extending in the lateral direction for receiving the elongate rod member therethrough.

3. The removable cartridge cleaner assembly of claim 2, wherein the upper engaging portion of the elongate support assembly includes a plurality of spaced openings therein for receiving the plurality of fastening projections of the elongate cartridge assembly.

4. The removable cartridge cleaner assembly of claim 1, wherein the lower engaging portion of the elongate cartridge assembly and the upper engaging portion of the elongate support assembly are mating portions having complimentary shapes such that the upper engaging portion of the elongate support assembly is in a nested configuration with the lower engaging portion of the elongate cartridge assembly when engaged therewith in the operative position for protecting the fastening projection from debris removed from the conveyor belt.

5. The removable cartridge cleaner assembly of claim 1, wherein the elongate cartridge assembly includes first and second transversely extending leg portions comprising the lower engaging portion, and the fastening projection extends between and is connected to both the first and second leg portions.

6. The removable cartridge cleaner assembly of claim 1, wherein the upper engaging portion of the elongate support assembly includes first and second transversely extending leg portions having an upper corner juncture therebetween with the leg portions extending transversely down and away from the corner juncture.

7. The removable cartridge cleaner assembly of claim 1, wherein the elongate rod member is configured to be disposed within a chamber of the elongate support assembly with one or both of a first and second end portion thereof protruding therefrom.

8. The removable cartridge cleaner assembly of claim 1, wherein the elongate support assembly includes a tube with a mounting flange disposed at each end thereof, wherein at least one of the mounting flanges includes a through-aperture aligned with the fastening projection through-opening for receiving the rod member therethrough.

9. The removeable cartridge cleaner assembly of claim 1, wherein the elongate support assembly includes at least one secondary cartridge support disposed adjacent to the upper engaging portion for supporting the elongate cartridge assembly adjacent to the upper engaging portion in an inoperative position with the fastening projection of the elongate cartridge assembly removed from the at least one opening in the upper engaging portion of the elongate support assembly.

10. The removeable cartridge cleaner assembly of claim 9, wherein the at least one secondary cartridge support includes a plate-like projection that extends transversely to a longitudinal axis of the elongate support assembly and is arranged and configured to support the elongate cartridge assembly in the inoperative position.

11. A removable cartridge cleaner assembly for cleaning a conveyor belt, comprising:
an elongate cartridge assembly having a length extending along a longitudinal axis, the elongate cartridge assembly configured for fixing at least one cleaner blade assembly thereto;
an elongate support assembly for supporting the elongate cartridge assembly having an elongate cartridge assembly engaging portion for engaging with and supporting the elongate cartridge assembly adjacent to and laterally across the conveyor belt;
a releasable connection of the elongate cartridge assembly to the elongate support assembly for allowing the elongate cartridge assembly to be secured to and removed from the elongate support assembly; and
a longitudinally extending chamber of at least one of the elongate cartridge assembly and the elongate support assembly that extends along the length of the elongate cartridge assembly, wherein the releasable connection extends longitudinally within the chamber such that the releasable connection is protected from fouling by conveyor belt debris released from the conveyor belt.

12. The removable cartridge cleaner assembly of claim 11, wherein the releasable connection includes at least a portion of an elongate rod member that extends in the chamber along the length of the elongate cartridge assembly when fixing the elongate cartridge assembly to the elongate support assembly.

13. The removable cartridge cleaner assembly of claim 11, wherein the releasable connection includes fastening projections having openings through which a common central axis extends that is aligned with or parallel to the longitudinal axis of the cartridge assembly.

14. The removable cartridge cleaner assembly of claim 11, wherein the elongate cartridge assembly includes at least one fastening projection and the elongate support assembly includes at least one opening for receiving the at least one fastening projection of the elongate cartridge assembly.

15. The removable cartridge cleaner assembly of claim 11, wherein the elongate support assembly includes a longitudinally extending through-opening disposed at an end of the chamber for receiving an elongate rod member therethrough to fix the elongate cartridge assembly to the elongate support assembly.

16. The removable cartridge cleaner assembly of claim 11, wherein the chamber includes a generally triangular cross-sectional area in a plane perpendicular to the longitudinal axis.

17. A cartridge assembly for a conveyor belt cleaning assembly, comprising:
an elongate base configured for being mounted to an elongate support member, the elongate base extending along a longitudinal axis and having a belt-facing side and an opposite elongate support member-facing side;
a belt cleaner blade assembly mounted to extend from the belt-facing side of the elongate base for scraping a conveyor belt; and
at least one fastening projection extending from the support member-facing side of the elongate base, wherein the at least one fastening projection includes a through-opening having a central axis that extends longitudinally.

18. The cartridge assembly of claim 17, wherein the belt cleaner blade assembly includes an elongate, unitary main body of resilient material, and a scraper blade of harder material mounted to the main body.

19. The cartridge assembly of claim 17, wherein the at least one fastening projection comprises a plurality of fastening projections, the plurality of fastening projections having a plurality of corresponding through-openings aligned along the central axis.

20. The cartridge assembly of claim 17, wherein the elongate base has first and second legs generally arranged in a V-shape, wherein the at least one fastening projection is between the first and second legs of the base.

21. The cartridge assembly of claim 20, wherein the belt cleaner blade assembly is mounted to one of the first and second legs.

22. A method for installing a cartridge cleaner assembly adjacent to a conveyor belt, the method comprising:
positioning a leading end portion of an elongate cartridge assembly having at least one cleaning blade assembly mounted thereto on at least one of a plurality of secondary support portions of an elongate support assembly that extends in a lateral direction across the conveyor belt transverse to a longitudinal belt travel direction;
sliding the elongate cartridge assembly on the secondary support portions in the lateral direction to be adjacent to an operative position of the elongate cartridge assembly on the elongate support assembly; and
pivoting the elongate cartridge assembly toward an elongate support member of the elongate support assembly so that at least one fastening projection of the elongate cartridge assembly is received in an aligned opening in the elongate support member which fixes the elongate cartridge assembly against sliding along the elongate support member.

23. The method of claim 22, further comprising inserting a rod member into the fastening projection of the elongate cartridge assembly to keep the elongate cartridge assembly securely on the elongate support assembly against separating therefrom.

24. The method of claim 23, further comprising engaging a rod locking device with the rod for securing the rod against shifting along the lateral direction.

25. The method of claim 23, wherein after the rod member is inserted into the fastening projection, the rod member and the fastening projection are disposed within a chamber of the elongate support assembly that extends along a length of the elongate support assembly.

26. The method of claim 22, further comprising positioning a lower engaging portion of the elongate cartridge assembly in conforming engagement with a correspondingly-shaped upper engagement portion of the elongate support assembly for protecting the fastening projection from debris removed from the conveyor belt.

27. The method of claim 22, further comprising pivoting the elongate cartridge assembly away from the elongate support member of the elongate support assembly and into engagement with the secondary support portions so that the fastening projection of the elongate cartridge assembly is removed from the aligned opening in the elongate support member to allow the elongate cartridge assembly to be slid on the secondary support portions in the lateral direction along the elongate support member for removal of the elongate cartridge assembly.

28. A cartridge cleaner assembly, comprising:
- an elongate cartridge assembly having at least one cleaning blade assembly mounted thereto and at least one fastening projection extending therefrom;
- an elongate support assembly configured for supporting and securing the elongate cartridge assembly in an operative position with the elongate cartridge assembly extending in a lateral direction across the conveyor belt transverse to a longitudinal belt travel direction, wherein the elongate support assembly has an opening configured for receiving the fastening projection of the elongate cartridge assembly; and
- a secondary support portion of the elongate support assembly configured for supporting the elongate cartridge assembly as the elongate cartridge assembly is shifted to be adjacent to an operative position of the elongate cartridge assembly on the elongate support assembly where the fastening projection is aligned with the opening in the elongate support assembly to allow the elongate cartridge assembly to be shifted to the operative position by pivoting the elongate cartridge assembly about an axis extending in the lateral direction to cause the fastening projection to be received in the opening.

29. The cartridge cleaner assembly of claim 28, further comprising a rod member, wherein the fastening projection includes a through-opening having an axis extending in the lateral direction configured for receiving the rod member therethrough to secure the elongate cartridge assembly to the elongate support assembly to keep the elongate cartridge assembly from separating from the elongate support assembly.

30. The cartridge cleaner assembly of claim 29, wherein the elongate support assembly has a chamber extending along a length thereof and the fastening projection and the rod member are received in the chamber when the elongate cartridge assembly is in the operative position.

31. The cartridge cleaner assembly of claim 29, wherein the fastening projection comprises a plurality of fastening projections having a plurality of corresponding through-openings each having an axis extending in the lateral direction and configured for receiving the rod member therethrough to secure the elongate cartridge assembly to the elongate support assembly.

32. The cartridge cleaner assembly of claim 31, wherein the opening in the elongate support assembly comprises a plurality of openings for receiving a corresponding fastening projection of the plurality of fastening projections.

33. The cartridge cleaner assembly of claim 28, wherein the secondary support portion comprises a plurality of plate-like projections that extend transversely to an axis extending in the lateral direction for supporting the elongate cartridge assembly as the elongate cartridge assembly is shifted to be adjacent to the operative position.

* * * * *